J. F. & H. E. SIPE.
SPRING WHEEL FOR VEHICLES.
APPLICATION FILED DEC. 7, 1909.
1,080,377.
Patented Dec. 2, 1913.
2 SHEETS—SHEET 2.
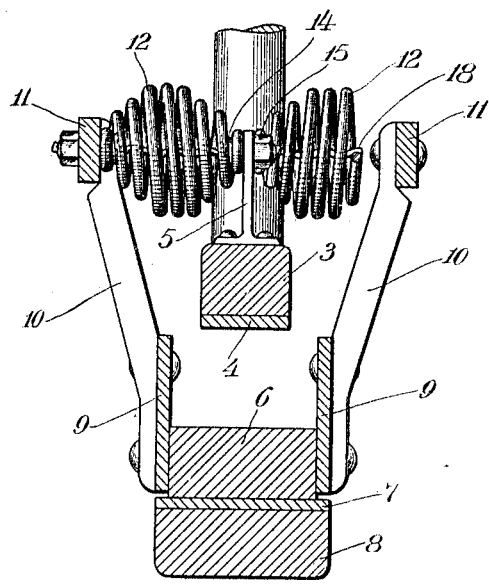
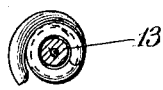
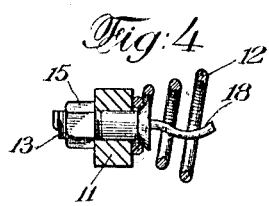
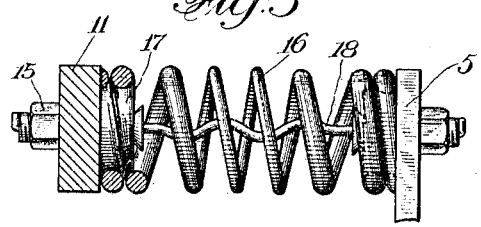
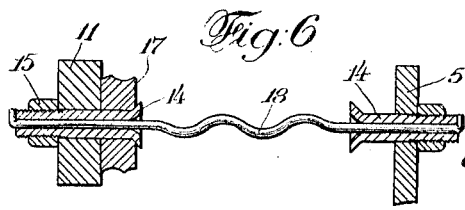

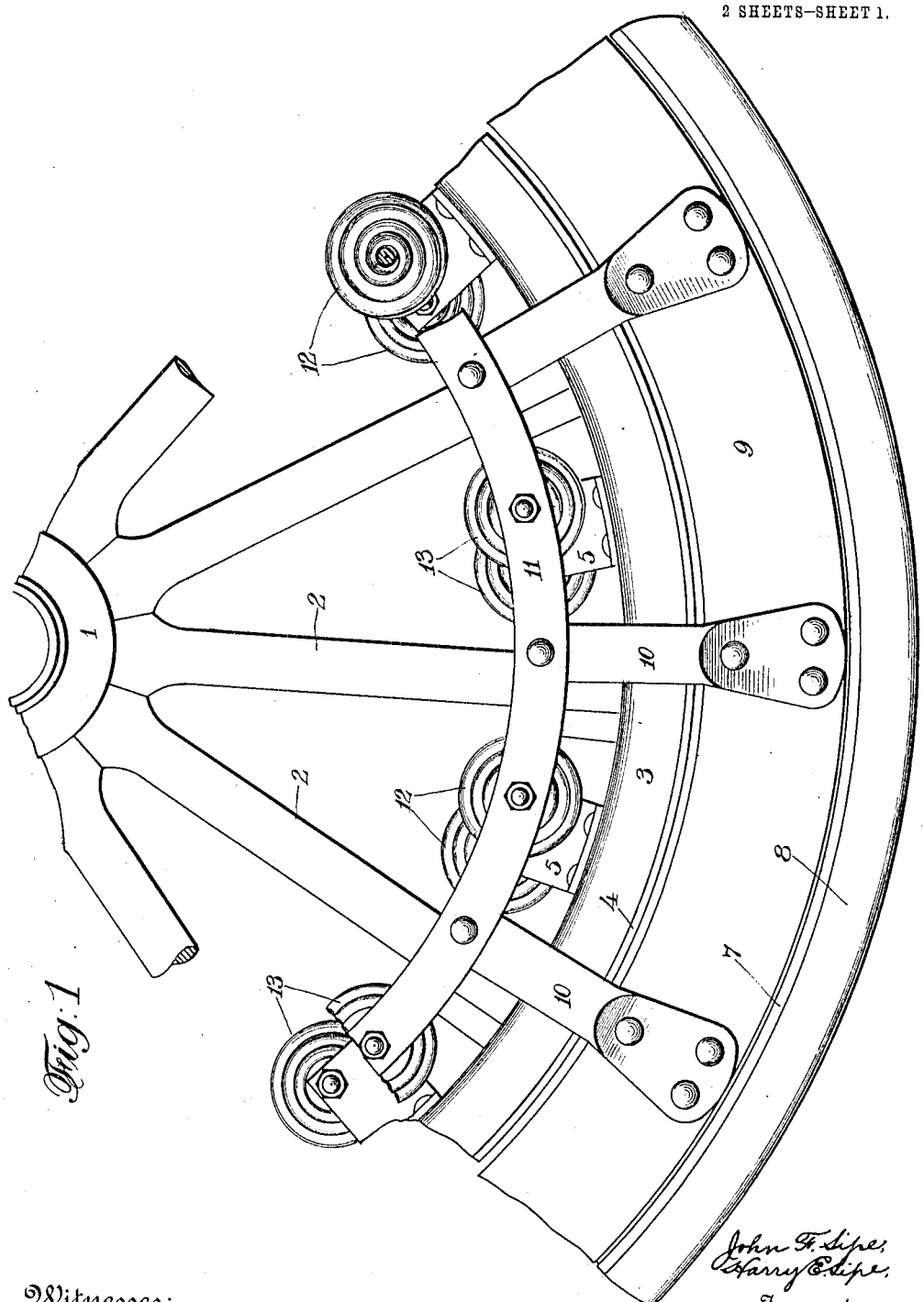

UNITED STATES PATENT OFFICE.

JOHN F. SIPE AND HARRY E. SIPE, OF NEW YORK, N. Y.

SPRING-WHEEL FOR VEHICLES.

1,080,377.  Specification of Letters Patent.  Patented Dec. 2, 1913.

Application filed December 7, 1909. Serial No. 531,762.

*To all whom it may concern:*

Be it known that we, JOHN F. SIPE and HARRY E. SIPE, citizens of the United States, and residents of New York city, in the county and State of New York, have invented certain new and useful Improvements in Spring-Wheels for Vehicles, of which the following is a specification.

The invention relates to a spring wheel of that general type in which the hub member is suspended upon the tread member by one or more series of springs set parallel to the axis of the wheel and connected at one end to the hub member, and at the other end to the tread member. In this type of wheel it has heretofore been considered necessary to connect the springs with the respective parts by means of some form of universal joint since in each revolution of the wheel the inner end of the spring moves completely around the other end of the spring in a circular path, the spring itself in each such revolution describing what is substantially a cone. This is necessarily true in all cases in which the springs are set parallel to the axis of the wheel. No universal joint has yet been devised which will permit of this movement without more or less sliding of the parts over one another, producing a grinding action which involves very great wear and materially shortens the life of the parts. If the connecting parts are small they are likely to wear out quickly; and if they are large, as in the case of certain forms of ball and socket joints, these larger parts in moving upon one another make a very disagreeable noise. Again in wheels of this character having springs parallel with the axis attached to the respective members by universal joints, a slight wearing of the parts of the universal joints allows a relatively large initial movement between the hub member and the tread member due to this wearing of parts, and thus a slight wearing of the parts will materially change the initial resilience unless special means are provided for continuously taking up the wear by the adjustment of the springs or their connections.

Our invention is designed to overcome the difficulties just enumerated by providing a specially designed spring and attaching it rigidly to the hub member and to the tread member. The spring is so constructed that it is capable of allowing the entire movement between the hub member and the tread member to take place within the spring itself, the attachment between the ends of the spring and its connected parts remaining rigid and immovable.

The invention is illustrated in the accompanying drawings in which—

Figure 1 is a side view of a part of a wheel embodying the said invention; Fig. 2 is a cross section of the tread member and a part of the hub member showing the way in which the springs are arranged between the same, and being broken away in part for clearer illustration; Figs. 3 and 4 are detailed views showing the method of attaching the springs to the bolts by which they are connected with the plates or brackets; Fig. 5 shows a modification of the invention; Fig. 6 is a longitudinal sectional view of Fig. 5 showing the method of attachment of the wire for limiting the torsional movement of the members.

Similar numbers denote similar parts in the different figures.

Referring to the drawings, 1 is the hub of the wheel.

2, 2 are the spokes.

3 is a wooden felly.

4 is a steel band attached in any suitable manner to the periphery of the felly 3.

5, 5 are T-shaped brackets which are bolted or otherwise suitably fastened to the inside of the felly 3. These brackets are preferably placed midway between the spokes of the wheel as shown in Fig. 1.

The parts already enumerated constitute the wheel member containing the hub or what may be called the hub member of the wheel.

6 is a wooden felly constituting a part of the tread member of the wheel. This wooden felly is preferably made three inches larger in inside diameter than the outside diameter of the steel band 4 of the hub member.

7 is a steel band which is fastened in any suitable manner to the periphery of the felly 6.

8 is a thin solid rubber tire which is fastened in any suitable manner to the exterior surface of the band 7.

9, 9 are side plates which are preferably annular in form and which are bolted or otherwise suitably fastened to the sides of the felly 6, as shown in Fig. 2.

10, 10 are arms which are bolted or otherwise suitably fastened at their outer ends to the side plates 9, and which are bolted or otherwise suitably fastened at their inner ends to the annular plates 11. There is an annular plate 11 on each side of the wheel supported from the side plate 9 on that side of the tread member.

The parts from 6 to 11 inclusive constitute a wheel member containing a tread, or what may be called the tread member.

The hub member and the tread member are connected together by means of the coiled springs 12 and 13. Half of these springs are placed on one side of the plane of the wheel, and half of them on the other side of the plane of the wheel. They are preferably arranged in pairs as shown. The inner end of each spring is rigidly attached to one of the brackets 5 of the hub member, and the outer end of the spring is rigidly attached to one of the annular plates 11 as illustrated in Figs. 2, 3 and 4. In the particular form of the invention shown in the drawings a screw-threaded bolt 14 is passed through the bracket 5, and the inner end of the spring 12 is coiled underneath the head of the bolt so as to form a tight and rigid joint. The head of the bolt is held firmly against the end of the spring by the nut 15 screwed onto the end of the bolt. The outer end of the spring 12 is fastened in like manner to the annular plate 11 so as to make a rigid attachment between the spring and the annular plate. The end coils of the spring are made of greater strength than the middle coils or main body thereof. In the form shown in Figs. 1 and 2 the end of the spring is strengthened or reinforced by gradually reducing the diameter of the end coils as shown. We prefer to employ springs which are wound with the coils slightly open, the main body of the spring being therefore a cross between a spring wound for compression, and one wound for extension. The springs are so connected and arranged that they are approximately parallel to the axis of the wheel.

In Fig. 5 we have shown another modification of the invention in which the end coils of the springs are made of the same size as the middle coils, but the former are reinforced and made of greater strength by being made of thicker wire.

In Fig. 5, 16 is a spring made in the manner just described, and 17 is a grooved washer adapted to receive the end of the spring as shown. 18 is a piece of spring wire which is fastened at one end to the annular plate 11 and at the other end to the bracket 5, and which operates to limit the torsional movement of the hub member within the tread member. We prefer to make this wire of such a length as to permit a slightly greater torsional movement between the two members than the distance between the steel band 4 and the felly 6. In the form shown in the drawings the steel wire is fastened to the plate 11 by passing the end of it through the middle of the bolt 14 and bending the extreme end against the outer end of the bolt. The other end of the wire is fastened to the bracket 5 in a similar manner. This method of attachment is illustrated in Fig. 6. These spring wires are placed inside of the coiled springs, and are thus held in place and protected.

The coiled springs are usually set under an initial tension, and when they are all set under a similar tension they act precisely alike at all times in opposing the load. In some cases, however, it will be found advantageous to have only a part of the springs oppose the initial load, and to have others which are not brought into action until the load is increased to a certain extent. To accomplish this result the springs can be arranged in different series set under different tensions. For example, referring to Fig. 1, the springs which are marked 12 represent springs which are set under a slight initial tension so as to carry the initial load, whereas the springs marked 13 represent springs which are slightly longer, and which are set normally under compression, as a result of which they are not brought into operation to oppose the load until the load has been increased to a certain point. In other words, the springs 12 of the first series are under one tension, being normally extended, and the springs 13 of the second series are under a different tension, being normally compressed, so as to be brought into operation at different times. The action of these coiled springs under load is quite different from that of springs set parallel to the axis but connected by universal joints. In our improved construction the springs offer a greater proportional initial resistance. The springs attached by universal bearings are extended directly endwise, the springs on opposite sides of the wheel when under load extending at opposite angles to one another, the angles varying with the load; whereas the springs set in the manner herein described assume somewhat the shape of the letter S under load, the several coils of the spring acting quite differently from one another, and the movement between the hub member and the tread member is brought about by a movement within the spring itself, and not by a movement of the parts of the universal joint one upon another. The employment of the spring wire for limiting the torsional movement is of advantage in that means is provided for preventing an excessive torsional movement which is additional to the springs, and in case of a tendency to extreme torsional movement the stress is carried by the spring wire, or whatever means is used for this purpose, and an excessive strain upon the spring is thereby avoided.

From the foregoing it will be seen that our invention greatly simplifies the construction of the spring wheel having springs set parallel to the axis, that it involves the use of a smaller number of parts, that the disadvantage of noise produced as a result of one part moving upon another is practically overcome, and that the durability of the wheel is greater because the deterioration of the parts due to their moving one upon another is substantially eliminated.

What we claim as new and desire to secure by Letters Patent, is:

1. In a spring wheel, the combination of a wheel member containing a hub, a wheel member containing a tread, a plurality of coiled springs set approximately parallel to the axis of the wheel and arranged in several series, the springs of one series being normally extended and the springs of another series being normally compressed, the end coils of the springs having the greatest strength and the strength of the coils being graduated from the ends of the springs toward the middle thereof, and the coils of the springs being separated so as to allow the middle coils to assume a position at an angle to the end coils, and one end of each spring being rigidly attached to the hub member, and the other end rigidly attached to the tread member, whereby the middle coils of the springs will have a much greater movement than the end coils.

2. In a spring wheel, the combination of a wheel member, containing a hub, a wheel member containing a tread, a plurality of coiled springs set approximately parallel to the axis of the wheel, the end coils of the springs having the greatest strength, and the strength of the coils being graduated from the ends of the springs toward the middle thereof, and the coils of the springs being separated so as to allow the middle coils to assume a position at an angle to the end coils, and one end of each spring being rigidly attached to the hub member, and the other end rigidly attached to the tread member, and means operating independently of the springs for limiting the torsional movement between the two members, whereby the middle coils of the springs will have a much greater movement than the end coils.

3. In a spring wheel, the combination of a wheel member containing a hub, a wheel member containing a tread, a plurality of coiled springs set approximately parallel to the axis of the wheel, the end coils of the springs having the greatest strength, and the strength of the coils being graduated from the ends of the springs toward the middle thereof, and the coils of the springs being separated so as to allow the middle coils to assume a position at an angle to the end coils, and one end of each spring being rigidly attached to the hub member, and the other end rigidly attached to the tread member, and wires connected with the two members for limiting their torsional movement, whereby the middle coils of the springs will have a much greater movement than the end coils.

4. In a spring wheel, the combination of a wheel member containing a hub, spokes and felly, and brackets attached to the inside of said felly, a tread member containing a tire, a felly, and side plates attached to the felly, an annular plate on each side of the wheel, arms connecting the side plates of the tread member with the annular plates so as to support the latter, and coiled springs rigidly attached at their inner ends to the brackets and at their outer ends to the annular plates, the end coils of the springs being of greater strength than the main body thereof.

5. In a spring wheel, the combination of a wheel member containing a hub, spokes and felly, and brackets attached to the inside of said felly, a tread member containing a tire, a felly, and side plates attached to the felly, an annular plate on each side of the wheel, arms connecting the side plates of the tread member with the annular plates so as to support the latter, and coiled springs rigidly attached at their inner ends to the brackets and at their outer ends to the annular plates, the end coils of the springs being of greater strength than the main body thereof, and wires within said springs fastened at one end to the annular plates and at the other end to the brackets to limit the torsional movement of the hub member and the tread member.

In testimony whereof, we have signed our names to this specification, in the presence of two subscribing witnesses.

JOHN F. SIPE.
HARRY E. SIPE.

Witnesses:
 GED. M. HARRIS,
 EWDIN SEGER.

---

Copies of this patent may be obtained for five cents each, by addressing the "Commissioner of Patents, Washington, D. C."